July 11, 1961 C. KATES 2,991,802
PRESSURE CONTROL VALVE FOR MOLDING MACHINES AND THE LIKE
Filed July 23, 1958 3 Sheets-Sheet 1

INVENTOR.
CHARLES KATES
BY *Isler E Ornstein*
ATTORNEYS

July 11, 1961 C. KATES 2,991,802
PRESSURE CONTROL VALVE FOR MOLDING MACHINES AND THE LIKE
Filed July 23, 1958 3 Sheets-Sheet 2

INVENTOR.
CHARLES KATES
BY
Isler & Ornstein
ATTORNEYS

July 11, 1961  C. KATES  2,991,802
PRESSURE CONTROL VALVE FOR MOLDING MACHINES AND THE LIKE
Filed July 23, 1958  3 Sheets-Sheet 3
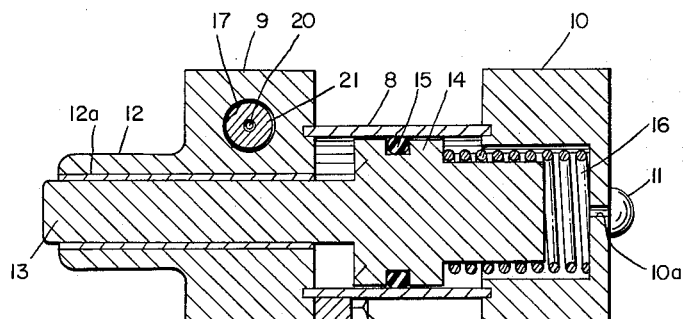
Fig.6
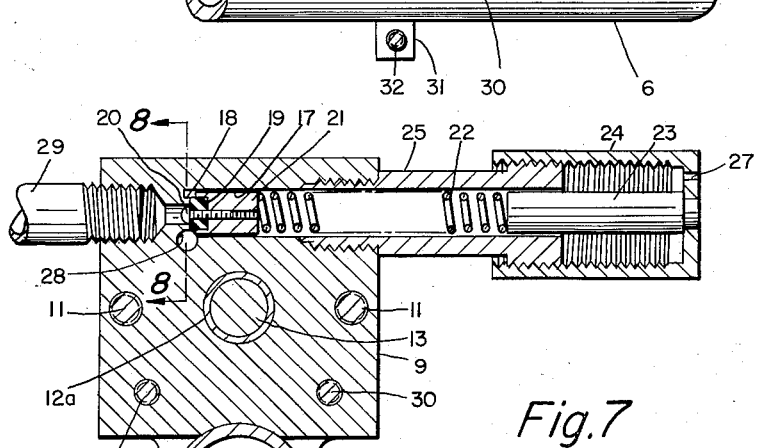
Fig.7
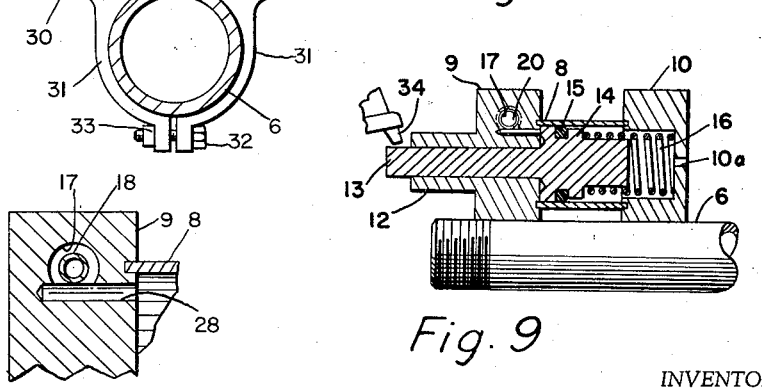
Fig.8
Fig.9
INVENTOR.
CHARLES KATES
BY
Isler & Ornstein
ATTORNEYS United States Patent Office 2,991,802
Patented July 11, 1961

2,991,802
PRESSURE CONTROL VALVE FOR MOLDING MACHINES AND THE LIKE
Charles Kates, Shaker Heights, Ohio, assignor to The Union Malleable Manufacturing Company, Ashland, Ohio, a corporation of Ohio
Filed July 23, 1958, Ser. No. 750,406
3 Claims. (Cl. 137—622.5)

This invention relates generally to pressure control valves, but has reference more particularly to a valve of this type which is especially useful for controlling the air pressure of the large volume air cylinder of a jolt squeeze molding machine.

A primary object of the invention is to provide a pressure control valve of the character described which is extremely efficient for the purpose for which it has been designed.

Another object of the invention is to provide a pressure control valve of the character described which can be quickly and easily adjusted to any desired pressure.

A further object of the invention is to provide a pressure control valve of the character described which consists of a minimum number of easily manufactured parts, which can be quickly and easily assembled.

Other objects and advantages of my invention will be apparent during the course of the following description.

In the accompanying drawings forming a part of this specification, and in which like numerals are employed to designate like parts throughout the same:

FIG. 6 is a cross-sectional view, taken on the line 6—6 of FIG. 5;

FIG. 7 is a cross-sectional view, taken on the line 7—7 of FIG. 5;

FIG. 8 is a fragmentary cross-sectional view, taken on the line 8—8 of FIG. 7, and FIG. 9 is a view similar to FIG. 6, but with the control valve in the condition in which it appears when the air supply valve is open, as in FIG. 2.

Figure 1:
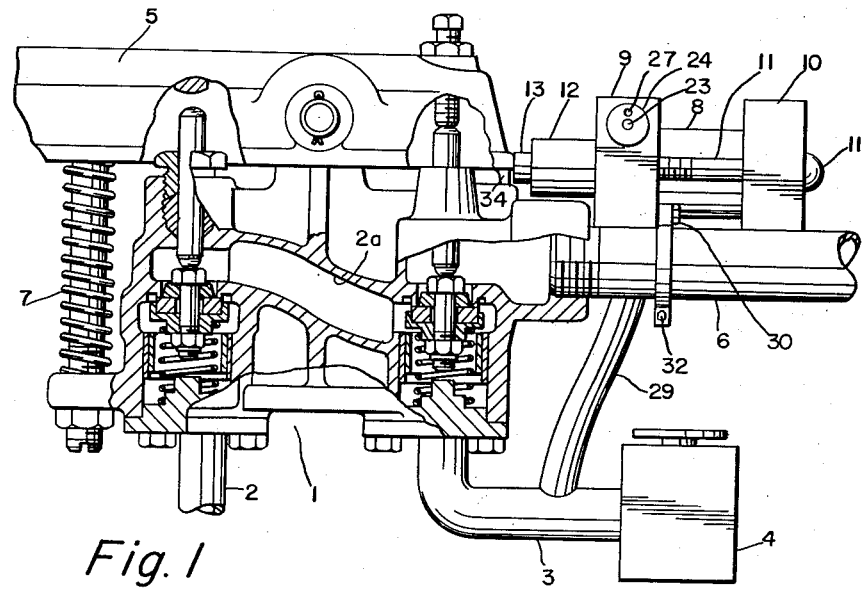
FIG. 1 is a view, partly in front elevation and partly in section, showing the control valve and the manner in which it is associated with the air supply valve, with the air supply valve in closed position.

Referring more particularly to the drawings, reference numeral 1 designates generally an air supply valve, which, in this case, is of a type made by SPO, Inc., of Cleveland, Ohio, which valve controls the flow of air from an air inlet conduit 2 to an air outlet conduit 3, whence the air passes into an air cylinder 4. The air cylinder 4 is a large volume air cylinder, the thrust of which is used for jolt squeeze molding machines and the like.

Figure 2:
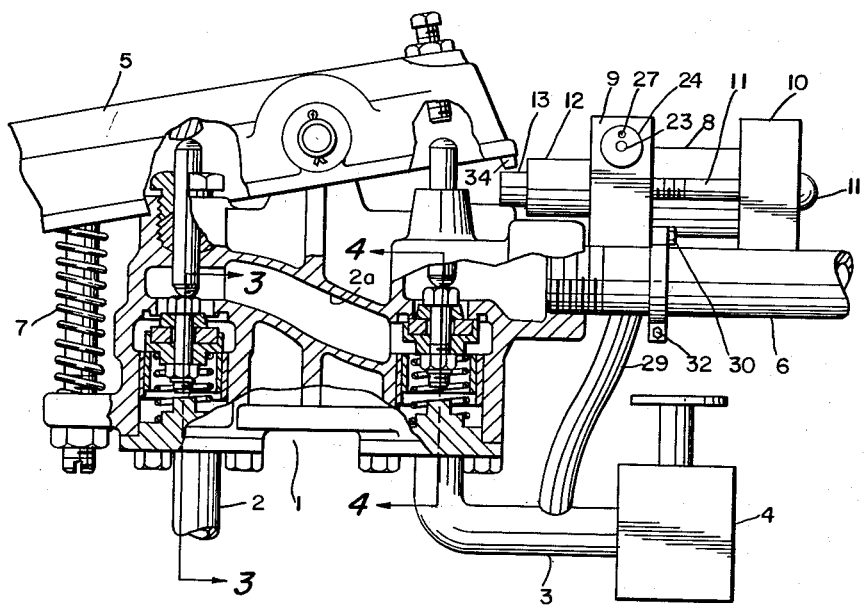
FIG. 2 is a view similar to FIG. 1, but with the air supply valve in open position.
Figure 3:
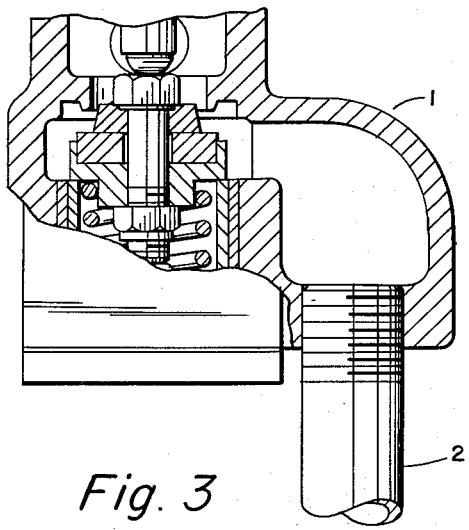
FIG. 3 is a fragmentary cross-sectional view, taken on the line 3—3 of FIG. 2.
Figure 4:
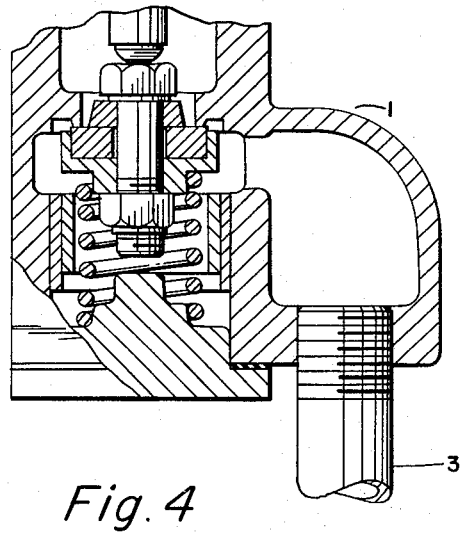
FIG. 4 is a fragmentary cross-sectional view, taken on the line 4—4 of FIG. 2.
Figure 5:
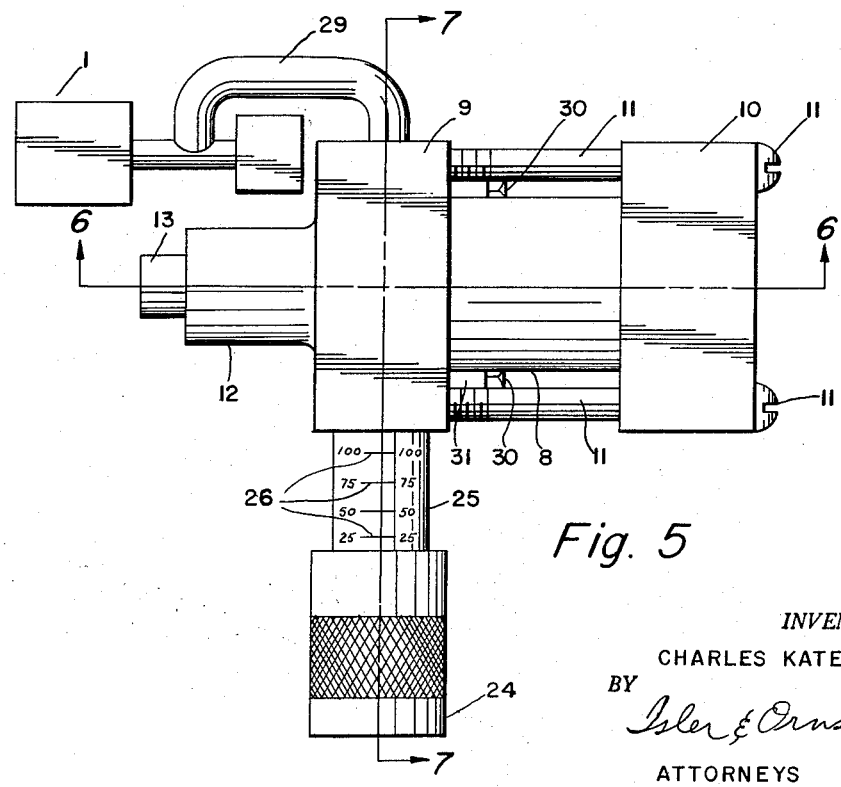
FIG. 5 is a top plan view of the control valve.

The detailed construction of the valve 1 is unimportant for the purposes of the present invention, except that it may be mentioned that when an operator pushes down on the valve handle 5, so as to move it to the position shown in FIG. 2, the valve 1 is open, permitting air to flow from conduit 2 through passageway 2a across the valve body and out through the conduit 3 and into the air cylinder 4. At this time, the valve at the right side of the air supply valve, as seen in FIG. 2 is closed, so that no air can enter the exhaust conduit 6. When the valve handle 5 is in the position shown in FIG. 1, the valve is closed, permitting air in the cylinder 4 to escape back through the valve 1 and out through the exhaust conduit 6. The closing of the valve 1 is automatically effected by a compression coil spring 7.

For the purpose of controlling the thrust of the air cylinder, I have provided an adjustable pressure control valve, which is designed to hold the valve 1 open until the pressure in the cylinder 4 reaches a desired amount, after which the pressure control valve acts to permit the valve 1 to close, thereby shutting off any additional air to the cylinder 4.

The adjustable pressure control valve comprises a cylinder 8 having heads 9 and 10 secured to the ends thereof, as by means of screw bolts 11, the cylinder head 9 being provided with an axial extension 12. A bushing 12a is press-fitted within the cylinder head 9 and extension 12.

Mounted for reciprocal movement in the bushing 12a is a piston rod 13, the head 14 of which is movable within the cylinder 8, and is provided with an O-ring 15, of synthetic rubber or the like. A compression coil spring 16 is interposed between the piston head 14 and the cylinder head 10. Air at the rear of the piston head 14 may be forced out into the atmosphere through an opening 10a in the head 10.

Extending transversely through the upper portion of the cylinder head 9 is a passageway 17, one end of which is formed to provide an annular seat 18 for a valve 19, which is secured, as by a screw 20, in one end of a plunger 21, which is slidably movable in the passageway 17. The valve 19 is normally maintained on the seat 18 by means of a compression coil spring 22 which is interposed between the plunger 21 and a rod 23, which is rigidly secured to a knurled control knob 24.

The control knob 24 is threadedly mounted on a barrel 25, which, in turn, is threadedly secured to the cylinder head 9. The barrel 25 is provided on its outer surface with spaced indicia 26 denoting graduated air pressures, and the control knob 24 may be adjusted to bring it to any of these indicia marks. The control knob 24 is provided with an opening 27 for releasing air within the knob.

Extending through the cylinder head 9 tangentially from the lower portion of the passageway 17, adjacent the valve seat 18, is a passageway 28 of relatively small diameter, which communicates with the interior of the cylinder 8.

A conduit 29 extends from the air outlet conduit 3 to the cylinder head 9, for admitting air from the conduit 3 into the passageways 17 and 28.

The adjustable pressure control valve is preferably mounted on the exhaust conduit 6, with the piston rod 13 thereof in alignment with the handle 5 of the valve. For this purpose, the cylinder head 9 has bolts 30 secured to the lower portion thereof, to which clamp members 31 are pivotally secured. These clamp members embrace the conduit 6 and are secured to each other, below the conduit, as by means of a bolt 32 and nut 33.

The operation or use of the adjustable pressure control valve will now be described.

In order to supply air to the cylinder 4, the operator depresses the valve handle 5, so as to move it to the position shown in FIGS. 2 and 9, thereby opening the valve 1.

When the valve handle 5 is thus depressed, the spring 16 forces the piston rod 13 to the left, to the position shown in FIG. 2, so as to bring the end of the piston rod under the toe 34 of the valve handle 5, thereby maintaining the valve handle in the open position. This permits air to flow into the air cylinder 4, building up pressure in said cylinder. Some of this air is bled through the conduit 29 to the control valve, and when the air pressure in the cylinder 4 reaches a preselected value, as set by the control knob 24 and one of the index marks 26 on the barrel 25 of the control valve, the air which passes through the conduit 29 lifts the valve 19 from its seat 18, permitting the air to pass through passageways 17 and 28, and into the cylinder 8, so as to cause the piston rod 13 to be retracted and permitting the spring 7 to move the handle 5 to the closed position, closing the valve 1, and thereby shutting off any additional air flow to the cylinder 4.

When the piston rod 13 is retracted, the spring 16 is compressed, so that it is at all times ready to move the piston rod to a position to hold the valve handle 5 open.

When the piston rod 13 is moved to the position in which it holds the valve handle 5 open, the air in the cylinder 8 which is to the left of the cylinder, as viewed in FIG. 6, is pushed out of the cylinder by the piston 14 through passageway 28 and passageway 17 and into the conduit 29, the valve 21 being momentarily lifted by this air to provide communication between the passageways 28 and 17. There is no deterrent to movement of the piston 14, because at the time air was exhausted from the conduit 3, it was simultaneously exhausted from the conduit 29, so that there is no counterpressure in the conduit 29 to oppose movement of the piston rod 13. The spring 16 acts to move the piston rod before sufficient counterpressure develops in the conduits 3 and 29 to prevent such movement of the piston rod.

It is thus seen that I have provided a control valve which is not only extremely efficient for the purpose for which it has been designed, but which can be quickly and easily adjusted to any desired pressure, and which consists of a minimum number of easily manufactured parts, which can be quickly and easily assembled.

It is to be understood that the form of my invention, herewith shown and described, is to be taken as a preferred example of the same, and that various changes may be made in the shape, size and arrangement of parts thereof, without departing from the spirit of the invention or the scope of the subjoined claims.

Having thus described my invention, I claim:

1. An air control valve assembly comprising a cylinder, spaced heads connected to the ends of said cylinder, a piston disposed in said cylinder and having a rod portion thereof extended through one of said spaced heads, spring means in the other of said spaced heads engaging one end of said piston for normally biasing said piston toward said one head, a first bore in said one head, a plunger slidably disposed in said first bore, a compression spring disposed in said first bore between one end thereof and one end of said plunger for biasing said plunger toward the other end of said first bore, a fluid conduit extended into said one head and communicating with a first port in said other end of said first bore, a second bore within said one head and communicating with the end of said cylinder adjacent said one head and with a second port which is in communication with said other end of said first bore, valve means on the other end of said plunger for normally closing both said first and second ports under the influence of said compression spring, said valve means being responsive to predetermined excessive pressure in either the fluid conduit or said second bore to open both of said ports and permit flow of fluid from said conduit to said cylinder whereby fluid from said conduit flows to the end of the cylinder adjacent said one head for moving the piston therein against the spring means to retract the extended rod portion of said piston or flows from said cylinder to said conduit through said second bore to exhaust fluid from said cylinder.

2. An air control valve assembly as defined in claim 1 in which said fluid conduit is coaxially aligned with the first bore in said one head and said second bore is substantially tangent to said first bore in said one head.

3. An air control valve assembly as defined in claim 1 including means for varying the pressure of said compression spring, said means comprising a control rod adjustably secured adjacent said one end of said first bore and disposed in abutting relation to the end of said compression spring adjacent said one end of said first bore.

References Cited in the file of this patent
UNITED STATES PATENTS

| | | |
|---|---|---|
| 2,217,880 | Woodson | Oct. 15, 1940 |
| 2,330,616 | Parker | Sept. 28, 1943 |
| 2,332,740 | Mott | Oct. 26, 1943 |
| 2,694,408 | McRae | Nov. 16, 1954 |
| 2,844,166 | Edman | July 22, 1958 |